US007652775B2

(12) United States Patent
Matsumoto

(10) Patent No.: US 7,652,775 B2
(45) Date of Patent: Jan. 26, 2010

(54) OPTICAL NEAR-FIELD GENERATOR AND RECORDING AND REPRODUCTION APPARATUS

(75) Inventor: Takuya Matsumoto, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 233 days.

(21) Appl. No.: 11/761,401

(22) Filed: Jun. 12, 2007

(65) Prior Publication Data
US 2007/0286031 A1 Dec. 13, 2007

(30) Foreign Application Priority Data
Jun. 12, 2006 (JP) ............... 2006-162405

(51) Int. Cl.
*G01B 11/02* (2006.01)
(52) U.S. Cl. ..................................... 356/507
(58) Field of Classification Search ......... 356/505–507; 369/13.13
See application file for complete search history.

(56) References Cited

U.S. PATENT DOCUMENTS 6,649,894 B2 * 11/2003 Matsumoto et al. ...... 250/201.3
6,688,743 B1 * 2/2004 Durnin et al. ............... 356/369
6,768,556 B1 * 7/2004 Matsumoto et al. ......... 356/601
6,949,732 B2 * 9/2005 Kiguchi et al. .............. 250/216
7,054,234 B2 * 5/2006 Saga et al. ................ 369/13.33

OTHER PUBLICATIONS

Hideki Saga, et al.; New Recording Method Combining Thermo-Magnetic Writing and Flux Detection; Japanese Journal of Applied Physics; Mar. 1999; pp. 1839-1840; vol. 38; Part 1, No. 3B.
E. Betzig, et al.; Near-field magneto-optics and high density data storage; Applied Physics Letter; Jul. 13, 1992; pp. 142-144; vol. 61, No. 2.
Sumio Hosaka, et al.; Phase change recording using a scanning near-field optical microscope; Journal Applied Physics; May 15, 1996; pp. 8082-8086; vol. 79, No. 10.

* cited by examiner

*Primary Examiner*—Michael A Lyons
(74) *Attorney, Agent, or Firm*—Antonelli, Terry, Stout & Kraus, LLP.

(57) ABSTRACT

Provided is an optical near-field recording and reproduction apparatus capable of adjusting the intensity of optical near-field and the amount of light bouncing off on the bottom of a slider around a scatterer and the surface of a medium and traveling back to a light source. A reflecting layer is formed above a structure for generating an optical near-field, and multiple beam interference is caused between the reflecting layer and the surface of the medium. The amount of returning above an optical near-field generator element is adjusted by adjusting the distance between the reflecting layer and the surface of the medium.

12 Claims, 14 Drawing Sheets

OPTICAL NEAR-FIELD GENERATOR AND RECORDING AND REPRODUCTION APPARATUS

CLAIM OF PRIORITY

The present application claims priority from Japanese application JP2006-162405 filed on Jun. 12, 2006, the content of which is hereby incorporated by reference into this application.

BACKGROUND OF THE INVENTION

1. Field of the Invention

The present invention relates to an optical near-field generator and a recording and reproduction apparatus including a head having an optical near-field generator mounted thereon.

2. Description of the Related Art

Thermally assisted magnetic recording has recently been proposed as a recording system for achieving a recording density of 1 Tb/in$^2$ or higher. With a recording density of 1 Tb/in$^2$ or higher, conventional magnetic recording apparatuses have a problem that thermal fluctuations destroy recorded information. The prevention of this requires enhancement of coercivity of a magnetic recording medium. Too high a coercivity, however, makes it impossible to form a record bit on the medium, because there is a limit to the magnitude of the magnetic field that a recording head can generate. To solve this, in the case of the thermally assisted magnetic recording, the coercivity is reduced at the instant of recording by heating the medium with light. This makes it possible to record on media with high-coercivity, and thus to achieve a recording density of 1 Tb/in$^2$ or higher.

For the thermally assisted magnetic recording apparatus, it is necessary that the spot size of light to be irradiated be substantially equivalent to the size of the record bit (e.g., a few tens nm). The reason is that the spot size of light in excess of a few tens nm erases information on an adjacent track. An optical near-field is used to heat such a minute region. The optical near-field is a local electromagnetic field (or light of which the wave number contains imaginary components) that is present in the vicinity of a minute object equal to or smaller than wavelengths of light. A microaperture having a diameter equal to or smaller than the wavelengths of light or a metallic scatterer is used to generate the optical near-field. An optical near-field generator using a metallic scatterer of a triangular shape is proposed as a high-efficiency optical near-field generator in Technical Digest of 6th international conference on near field optics and related techniques, the Netherlands, Aug. 27-31, 2000, p 55, for example. When light enters the metallic scatterer, plasmon resonance is excited in the metallic scatterer, and a strong optical near-field is generated on a vertex of the triangle. Using this optical near-field generator makes it possible to focus light with high efficiency on a region equal to or smaller than a few tens of nanometers.

The thermally assisted magnetic recording apparatus uses a magnetic reproduction element, such as a giant magnetoresistive (GMR) element or a tunneling magnetoresistive (TMR) element, as means for reproducing which reproduces recorded information (see H. Saga, H. Nemoto, H. Sukeda, and M. Takahashi, Jpn. J. Appl. Phys. 38, Part 1, 1839 (1999)). However, an optical near-field may be utilized as the reproduction means, in place of the magnetic reproduction element. For example, there is a report on an experiment in which a mark recorded on a magnetic medium is reproduced by monitoring the rotation of polarized light (see E. Betzig, J. K. Trautman, R. Wolfe, E. M. Gyorgy, P. L. Finn, M. H. Kryder and C.-H. Chang, Appl. Phys. Lett. 61, 142 (1992)). There is also a report on an experiment in which a mark recorded on a phase change medium is reproduced by monitoring a change in the intensity of reflected light (see S. Hosaka, T. Shintani, M. Miyamoto, A. Kikukawa, A. Hirtsune, M. Terao, M. Yoshida, K. Fujita, S. Krammer, J. Appl. Phys. 79, 8082 (1996)).

SUMMARY OF THE INVENTION

When a scatterer is used to generate an optical near-field as mentioned above, one part of light entering the scatterer bounces off on the bottom of a slider around the scatterer or the surface of a medium and travels back to a light source (e.g., a semiconductor laser). The entry of the reflected light into the light source makes laser power unstable (or increases noise). As a result, this makes it impossible to form a uniform recorded mark. When an optical near-field is utilized to reproduce recorded information, an S/N (signal-to-noise) ratio becomes low due to laser noise caused by returned light and noise caused by reflected light detected as background light by a detector.

An object of the present invention is both to achieve a high efficiency of optical near-field generation and to provide means which solves the foregoing problems.

According to the present invention, a reflecting layer is formed above the top of a scatterer for generating an optical near-field; and multiple beam interference occurs between the reflecting layer and the surface of a medium. When the thickness of a layer around the scatterer is adjusted so that light reflected from the reflecting layer and light reflected from the surface of the medium can cancel each other out, this makes it possible to reduce the amount of light traveling back to a light source. When the thickness of the layer around an optical near-field generator element is adjusted so as to minimize the amount of light traveling back to the light source, the light bounces back and forth between the reflecting layer above the scatterer and the surface of the medium (that is, the light is confined within the layer around the scatterer). This corresponds to an increase in the amount of light entering the scatterer for generating the optical near-field, thus making it possible to increase the intensity of optical near-field generated in the vicinity of the scatterer.

The reflecting layer may be a metal layer, an interface between two layers of different refractive indices, or a dielectric multilayer. To increase reflectivity on the medium, a metal layer for reflection may be interposed under a recording layer of the medium. Preferably, the thickness of the layer around the scatterer is greater than zero in order to induce the multiple beam interference, and is also three or less times the wavelength of the light propagating through the layer in order to prevent a decrease in the efficiency of utilization of optical near-field. When the layer has a great thickness, the propagation of the light through the layer leads to the increased spot size of the light and the curved wave surface thereof, and thus resulting in the decreased efficiency of utilization of optical near-field. Preferably, the thickness of the layer is substantially equal to the minimum value of the thickness that satisfies conditions of interference (or a thickness that minimizes the amount of light traveling back to the light source) in order to maximize the efficiency. The scatterer and the reflecting layer may be formed on the end of a waveguide or the bottom of a condenser lens.

A structure in which the reflecting layer is formed above the scatterer may be used to monitor the flying height of a head (or the slider). Variations in the flying height of the head cause variations in a distance between the reflecting layer above the scatterer and the medium, and hence variations in a phase difference between the light reflected from the reflecting layer and the light reflected from the surface of the medium. This leads to variations in the conditions of interference therebetween and hence variations in the intensity of the light traveling back to the light source. The flying height can be therefore monitored by monitoring the amount of change in the reflected light. Thus, the flying height can be controlled by monitoring the flying height.

To monitor the flying height, the thickness of the layer around the scatterer is set so as to substantially maximize the absolute value of the reflectivity R differentiated with respect to t:

$$\left|\frac{dR}{dt}\right| = |f'(t_0)|$$

where $t_0$ denotes a desired flying height, provided that the relation between the flying height t and the reflectivity R can be expressed as an equation, R=f(t). This makes it possible to detect the flying height with the highest sensitivity. Moreover, t is set so that the magnitude of the reflectivity R differentiated with respect to t can be minus. This makes it possible to reduce variations in the intensity of optical near-field due to the variations in the flying height of the head.

Two light beams of different wavelengths may be utilized to maximize the intensity of optical near-field, minimize the amount of the light traveling back to the light source, and detect the variations in the flying height with the highest sensitivity. The thickness of the layer around the optical near-field generator element is set so as to minimize the amount of returned light, of the light for generating the optical near-field, traveling back to the light source. At this time, light with a slightly different wavelength is entered, and returned light of the entered light is detected for use in the monitoring of the flying height.

According to the present invention, an optical near-field recording and reproduction apparatus can adjust the amount of light reflected from the bottom of the slider around the scatterer or the surface of the medium and the intensity of optical near-field. Moreover, the apparatus can monitor the flying height of the head.

DETAILED DESCRIPTION OF THE INVENTION

Embodiments of the present invention will be described below with reference to the accompanying drawings.

First Embodiment

Figure 1:
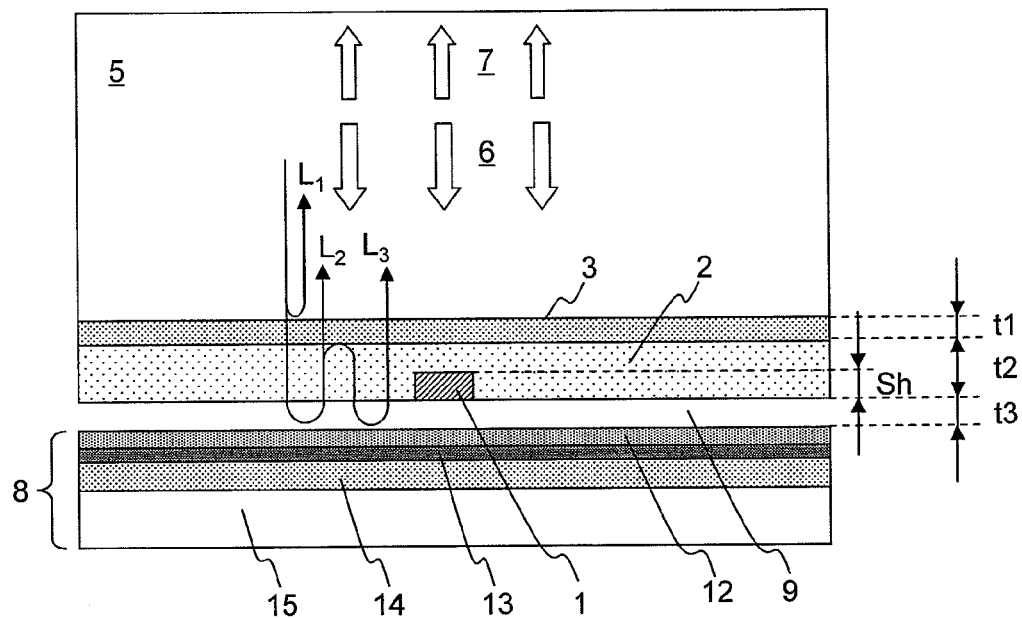
FIG. 1 is a sectional side view showing an optical near-field generator according to the present invention.
Figure 2:
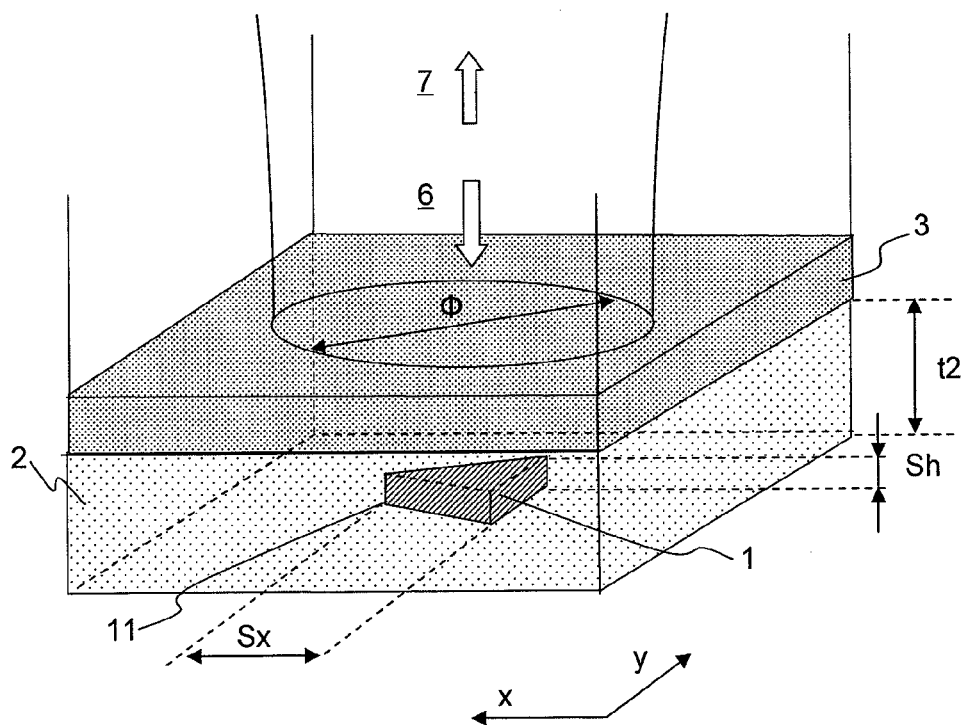
FIG. 2 is a perspective view showing the optical near-field generator according to the present invention.

FIG. 1 shows an example of the structure of an optical near-field generator according to the present invention. A scatterer 1 for generating an optical near-field is formed on the bottom of a slider 5 that forms a base of a head. As shown in FIG. 2, the scatterer 1 is triangular in plan configuration, is made of gold, and has the length Sx of 100 nm, the thickness Sh of 50 nm and the vertical angle of 60 degrees of a vertex 11 on which the optical near-field is generated. A material around the scatterer 1 is $SiO_2$ (silicon oxide). A reflecting layer 3 for reflecting light is formed above the top of the scatterer 1. As employed herein, the "top" refers to the opposite direction to a medium. The reflecting layer 3 is made of gold and has the thickness $t_1$ of 20 nm. A material for the top of the reflecting layer 3 is $Ta_2O_5$ (tantalum oxide) (with a refractive index $n_0$ of 2.18). A magnetic recording medium 8 is formed of an overcoat film 12 of 2 nm thick (made of SiN (silicon nitride)), a magnetic recording layer 13 of 6 nm thick (made of FePt (an iron-platinum alloy)), and a metal layer 14 of 30 nm thick (made of gold) formed under the magnetic recording layer 13. At this point, the metal layer 14 acts as a heat sink layer to prevent an increase in the size of a recorded mark due to thermal diffusion and also acts to increase the intensity of optical near-field (specifically to increase the intensity of optical near-field by producing the interaction between excited electric charge and electric charge in the scatterer by exciting in the metal layer 14 a mirror image of the electric charge in the scatterer). The metal layer 14 further acts to increase the amount of light reflected from the surface of the medium in order to increase the effect of multiple beam interference to be described later. An air gap 9 between the slider and the medium has the thickness $t_3$ of 8 nm, and a substrate 15 of the medium is made of glass.

When light enters the above structure in the direction of arrow 6 of FIG. 1, the light is partially reflected by the reflecting layer 3 (as shown by $L_1$ in FIG. 1) and partially passes through the reflecting layer 3. The light, after passing through the reflecting layer 3, bounces off on the surface of the medium 8 and travels back to a light source. One part of the returned light passes through the reflecting layer 3 (as shown by $L_2$ in FIG. 1), and the other part is reflected by the reflecting layer 3 and again travels in a downward direction. Then, the light again bounces off on the surface of the medium 8 and travels back to the light source. One part of the returned light passes through the reflecting layer 3 (as shown by $L_3$ in FIG. 1), and the other part is reflected by the reflecting layer 3 and again travels in the downward direction. Light repeatedly bounces back and forth between the reflecting layer 3 and the surface of the medium 8, as mentioned above. The light $L_1$ reflected from the reflecting layer interfere with the light beams $L_2$ and $L_3$ reflected from the surface of the medium, as mentioned above (that is, multiple beam interference occurs). When a phase difference between the reflected light $L_1$ and the light beams $L_2$ and $L_3$ reflected from the surface of the medium is adjusted by adjusting the thickness $t_2$ of a layer 2 around the scatterer, the light $L_1$ as well as the light beams $L_2$ and $L_3$ cancel out each other. In other words, this makes it possible to reduce the amount of light 7 traveling back to the light source.

To estimate the amount of the light 7 traveling back to the light source, it is strictly necessary to take into account the thickness $t_1$ of the reflecting layer 3, reflection from the surface of the slider, an internal structure of the medium 8, and so on. Specifically, the ratio (or reflectivity) R between the intensity of the light 7 returning in an upward direction and the intensity of the incoming light 6 is expressed by Equation (1), where $\epsilon_0, \mu_0$ and $k_0$ represent a dielectric constant, magnetic permeability and a wave number, respectively, in a vacuum, provided that the thicknesses and refractive indices (expressed as complex numbers) of a slider 5 on top of the reflecting layer 3, the reflecting layer 3 (or "Layer A"), the layer 2 (or "Layer B") around the scatterer, the air gap 9, the overcoat film 12 of the medium, the magnetic recording layer 13, the metal layer 14 of the medium, and the substrate 15 of the medium are set as given in Table 1.

TABLE 1

|  | Thickness | Refractive index |
|---|---|---|
| Substrate (slider) |  | $n_0$ |
| Layer A | $t_1$ | $n_1$ |
| Layer B | $t_2$ | $n_2$ |
| Air gap | $t_3$ | $n_3$ |
| Overcoat | $t_4$ | $n_4$ |
| Recording layer | $t_5$ | $n_5$ |
| Underlayer | $t_6$ | $n_6$ |
| Substrate (medium) |  | $n_7$ |

$$R = \left| \frac{Y_0 m_{11} + Y_0 Y_s m_{12} - m_{12} - Y_s m_{22}}{Y_0 m_{11} + Y_0 Y_s m_{12} + m_{12} + Y_s m_{22}} \right|^2 \quad (1)$$

where

-continued $$Y_0 = \sqrt{\frac{\epsilon_0}{\mu_0}} n_0,$$

$$Y_s = \sqrt{\frac{\epsilon_0}{\mu_0}} n_s,$$

$$\begin{bmatrix} m_{11} & m_{12} \\ m_{21} & m_{22} \end{bmatrix} = M_1 M_2 M_3 M_4 M_5,$$

$$M_i = \begin{bmatrix} \cos k_0 n_i d_i & (i \sin k_0 n_i d_i) / \left( \sqrt{\frac{\epsilon_0}{\mu_0}} n_i \right) \\ \sqrt{\frac{\epsilon_0}{\mu_0}} n_i i \sin k_0 n_i d_i & \cos k_0 n_i d_i \end{bmatrix}$$

$$(i = 1, 2, \ldots, 5),$$

and i denotes an imaginary unit. $M_i$ denotes matrices called "characteristic matrices," which represent the characteristics of the layers. Although the laminar structure given in Table 1 is employed in the first embodiment, a characteristic matrix for an additional layer can be added when the additional layer is formed in the slider or the medium.

Figure 3:
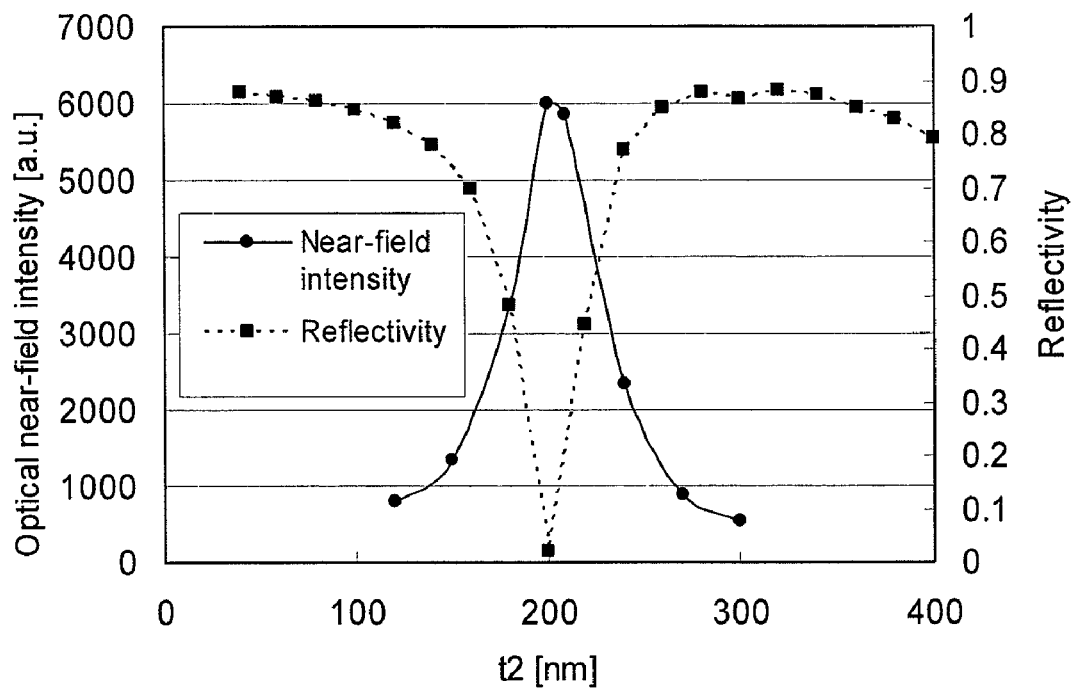
FIG. 3 is a plot showing the relations among the thickness $t_2$ of a layer around a scatterer, reflectivity and the intensity of optical near-field.

FIG. 3 shows the relation between the thickness $t_2$ of the layer 2 around the scatterer and the reflectivity R (as shown by the dotted line of FIG. 3), which is calculated using the above equation. As shown in FIG. 3, the magnitude of the reflectivity can be adjusted by adjusting the thickness $t_2$ of the layer 2 around the scatterer. It is desirable that the reflectivity be minimized to reduce the influence of laser noise and background light during optical reproduction. In this case, it is found desirable that the thickness $t_2$ be substantially equal to 200 nm.

Using the above structure makes it possible to both adjust the reflectivity and adjust the intensity of optical near-field. The solid line of FIG. 3 shows the relation between the intensity of optical near-field and the thickness $t_2$ of the layer 2 around the scatterer, which is calculated by using finite difference time domain (FDTD) method. At this point, the wavelength of incoming light is 780 nm. As shown in FIG. 3, the intensity of optical near-field is maximized when the thickness $t_2$ is substantially equal to 200 nm, which minimizes the reflectivity. Under such conditions, light bounces back and forth between the reflecting layer 3 and the surface of the medium (that is, the light is confined within the layer 2). This corresponds to an increase in the amount of light entering the scatterer 1, which effects an increase in the intensity of optical near-field generated in the vicinity of the scatterer. Increasing the intensity of optical near-field in this manner makes it possible to reduce light intensity required for recording, and hence reduce power consumption by a recording apparatus.

Figure 4:
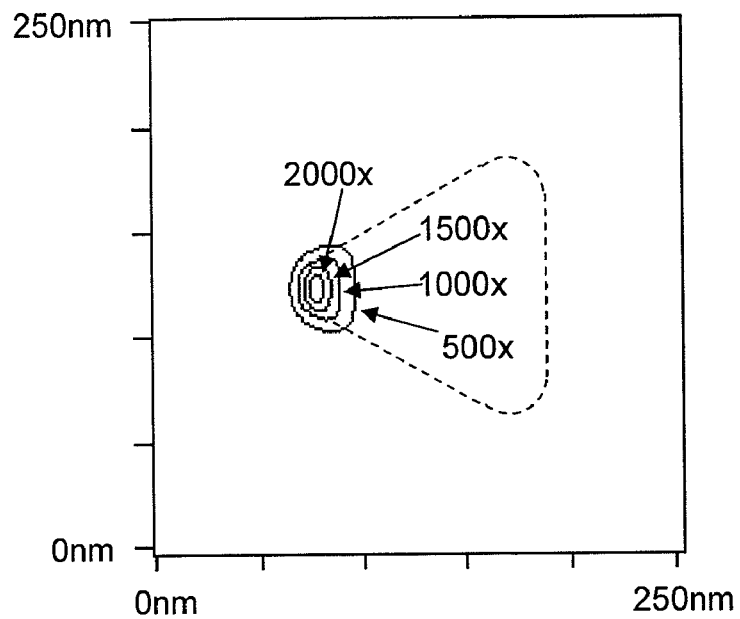
FIGS. 4A and 4B are plots showing the distributions of the intensity of optical near-field in the absence and presence of a reflecting layer, respectively.
Figure 4:
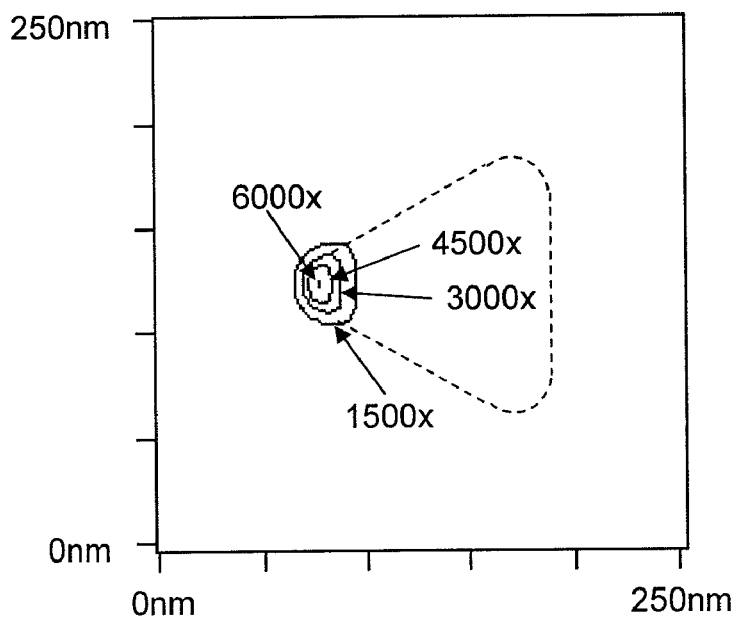

FIGS. 4A and 4B show the distributions of the intensity of optical near-field on the surface of the medium in the absence and presence of the reflecting layer 3, respectively. FIGS. 4A and 4B show the ratio of the intensity of optical near-field to the intensity of incoming light. FIGS. 4A and 4B show the distributions in the absence and presence of the reflecting layer 3, respectively. In the presence of the reflecting layer 3, the thickness $t_2$ of the layer 2 around the scatterer is 200 nm. As can be seen from FIGS. 4A and 4B, the presence of the reflecting layer 3 yields about a threefold increase in the intensity of optical near-field.

As described above, when the reflecting layer 3 is formed above the top of the scatterer 1, and the thickness $t_2$ of the layer 2 around the scatterer is adjusted, this makes it possible to both increase the intensity of optical near-field and reduce the amount of the light 7 traveling back to the light source.

The thickness $t_2$ of the layer 2 around the scatterer has to exceed zero in order that the multiple beam interference occurs (specifically, the thickness $t_2$ of 0 leads to coincidence between the underside of the reflecting layer 3 and the bottom of the slider, and thus resulting in no multiple beam interference therebetween). As opposed to this, too great a thickness $t_2$ of the layer 2 around the scatterer, however, leads to a decrease in the intensity of optical near-field for reasons (1) and (2) as given below. The reason (1) is as follows. Too great a thickness $t_2$ of the layer 2 around the scatterer causes an increase in the spot size of light within the layer 2 around the scatterer. The increased spot size of light causes an increase in the amount of light passing through the scatterer rather than entering the scatterer, and thus causing a decrease in the intensity of optical near-field (incidentally, the efficiency of optical near-field generation varies inversely with the square of the spot size of incoming light). The reason (2) is as follows. The wave surface of light propagating through the layer 2 around the scatterer becomes spherical in shape on a reflecting surface, so that little multiple beam interference occurs. This results in both a decrease in the intensity of optical near-field and an increase in the amount of the reflected light 7.

Figure 5:
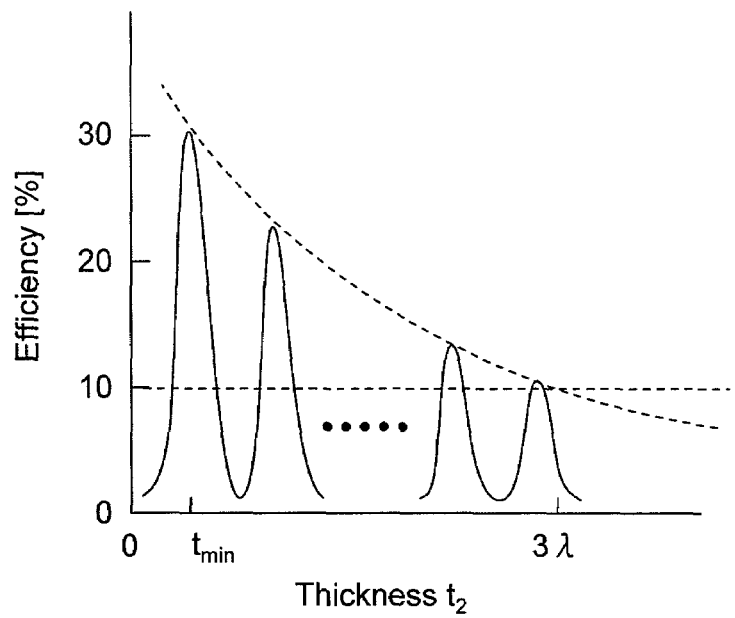
FIG. 5A is a plot showing the relation between the thickness of the layer around the scatterer and the efficiency of optical near-field generation.
FIG. 5B is a plot showing the relation between the thickness of the layer around the scatterer and the spot size of light incident on the scatterer.
Figure 5:
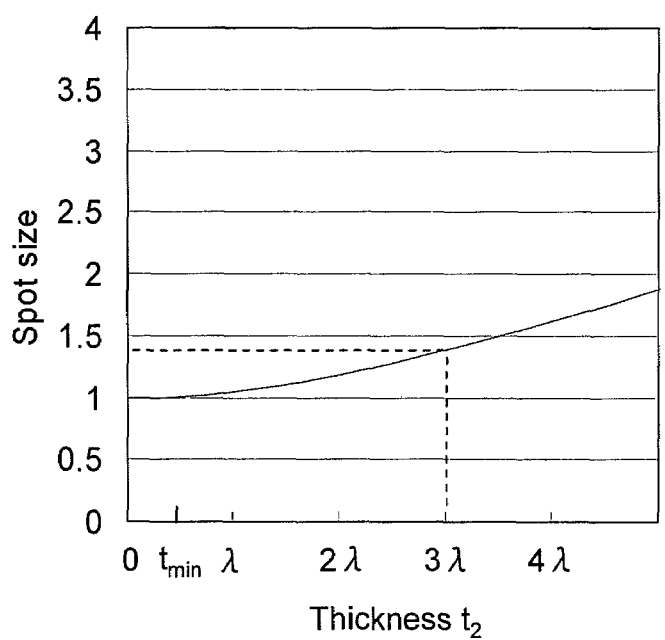

An optimum value for the thickness $t_2$ of the layer 2 around the scatterer will hereinafter be determined, using the spot size. FIG. 5A shows the relation between the thickness $t_2$ of the layer 2 around the scatterer and the efficiency of optical near-field generation, which exists when a spot size $\Phi$ (or $\Phi$ in FIG. 2) of incident light on the reflecting layer 3 is 1 μm. As shown in FIG. 5A, when the thickness $t_2$ of the layer 2 around the scatterer satisfies conditions of interference described for the above embodiment (that is, the amount of light traveling back to the light source is minimized), the efficiency of optical near-field generation is high. For example, the minimum value $t_{min}$ of the thickness that satisfies the conditions of interference is 200 (nm) for the structure of the above embodiment. The thickness that satisfies the conditions of interference can take on values other than the value $t_{min}$. However, the efficiency of optical near-field generation, when the thickness $t_2$ has any value other than the value $t_{min}$, is lower than the efficiency thereof that is achieved when the thickness $t_2$ is equal to the value $t_{min}$ ($t_2=t_{min}$), as shown in FIG. 5A. The reason is that a great thickness $t_2$ of the layer 2 around the scatterer causes light to spread through the layer 2 around the scatterer, and thus leading to an increase in the spot size of incident light on the scatterer 1. From the above, it is found desirable that the thickness $t_2$ of the layer 2 around the scatterer be substantially equal to the minimum value $t_{min}$ of the thickness that satisfies the conditions of interference (or the thickness that minimizes the amount of light traveling back to the light source). Incidentally, the thickness $t_2$ of the layer 2 around the scatterer may be greater than the minimum value $t_{min}$ of the thickness that satisfies the conditions of interference, provided only that it satisfies a required efficiency. For application to the recording apparatus, it is desirable that the efficiency of optical near-field generation be equal to or higher than 10% in order to reduce power consumption. In the above embodiment, the efficiency of optical near-field generation is about 30% when the thickness $t_2$ is equal to the value $t_{min}$ ($t_2=t_{min}$). The spot size of incident light on the scatterer 1 must be therefore reduced so that the spot size can be $1/\sqrt{(30\%/10\%)}$ times, i.e., $1/\sqrt{3}$ times, the spot size that is obtained when $t_2=t_{min}$, in order that the efficiency is equal to or higher than 10%. FIG. 5B shows the relation between the thickness $t_2$ of the layer 2 around the scatterer and the spot size of incident light on the scatterer 1. As can be seen from FIG. 5B, the thickness $t_2$ of the layer 2 around the scatterer has to be equal to or less than $3\lambda$ in order to achieve an efficiency of 10% or higher.

Although the scatterer, employed in the above embodiment, is triangular in plan configuration, the scatterer may be circular, elliptical, a rectangular parallelepiped, spherical, or the like in plan configuration. The scatterer may be partially cut away as disclosed in Japanese Patent Application Laid-open Publication No. 2004-151046. The scatterer may be made of any material, provided that it is electrically conductive. The scatterer may be made of metal such as silver, copper, aluminum, iron or nickel, an alloy of these metals, or a semiconductor such as Si (silicon). Although $SiO_2$ is used for the layer around the scatterer, a dielectric such as $SiO_2$, $Al_2O_3$ (aluminum oxide) or $MgF_2$ (magnesium fluoride) may be used. In the above embodiment, the material for the top of the reflecting layer 3 is different from that for the underside of the reflecting layer 3. However, the material for the top thereof may be the same as that for the underside thereof.

Figure 6:
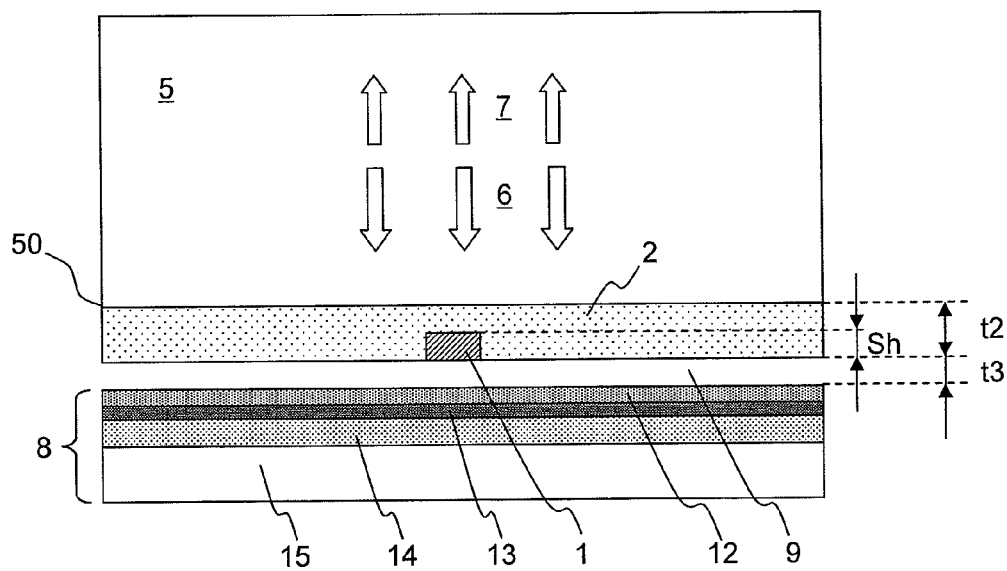
FIG. 6 is a cross-sectional view showing an instance where an interface between two layers of different refractive indices is used as the reflecting layer.

In the above embodiment, the metal reflecting layer 3 is formed above the top of the scatterer to thereby return to the medium the light beams reflected from the surface of the medium 8 and the bottom of the slider 5. As shown in FIG. 6, the structure may be such that the refractive index of the material for the layer 2 around the scatterer 1 is different from that of the material for the substrate 5 on top of the layer 2, so that light bounces off on an interface 50 between the layer 2 and the substrate 5. In FIG. 6, the material for the layer 2 around the scatterer 1 is $SiO_2$ (with a refractive index $n_2$ of 1.45), and the material for the top thereof is $Ta_2O_5$ (with a refractive index $n_0$ of 2.18). The material for and dimensions of the scatterer 1, the structure of the medium and others are the same as those shown in FIGS. 1 and 2. At this point, the ratio (or reflectivity) R between the intensity of the reflected light 7 returning in the upward direction and the intensity of the incoming light 6 is expressed by the above equation (1), provided that the refractive indices and thicknesses of the layers are set as given in Table 2. However, $M_i$ denotes a unit matrix because there is no layer for the matrices $M_i$.

TABLE 2

| | Thickness | Refractive index |
|---|---|---|
| $Ta_2O_5$ | | $n_0$ |
| $SiO_2$ | $t_2$ | $n_2$ |
| Air gap | $t_3$ | $n_3$ |
| Overcoat | $t_4$ | $n_4$ |
| Recording layer | $t_5$ | $n_5$ |
| Underlayer | $t_6$ | $n_6$ |
| Substrate (medium) | | $n_7$ |

Figure 7:
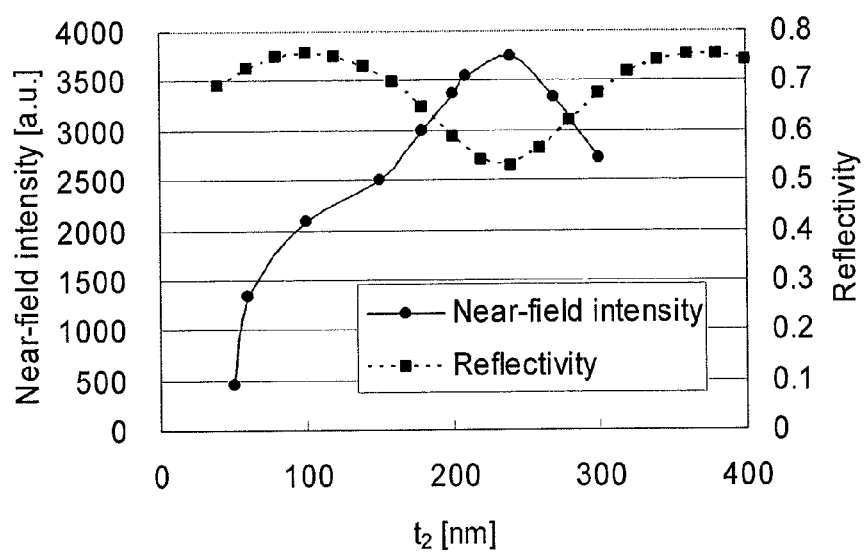
FIG. 7 is a plot showing the relations among the thickness $t_2$ of the layer around the scatterer, the reflectivity and the intensity of optical near-field in a case where the interface between the two layers of different refractive indices is used as the reflecting layer.

FIG. 7 shows the relations among the thickness $t_2$ of the layer around the scatterer, the reflectivity R and the intensity of optical near-field, which exist in the case of the structure shown in FIG. 6. At this point, the wavelength of incoming light is 780 nm. When the thickness $t_2$ of the layer around the scatterer is substantially equal to 240 nm, the reflectivity is minimized, and the intensity of optical near-field is maximized, as shown in FIG. 7. In other words, setting the thickness $t_2$ of the layer around the scatterer to the above value makes it possible to increase the intensity of optical near-field and reduce the amount of the light 7 traveling back to the light source. Although one layer 50 is shown in FIG. 6 as having different refractive indices on both sides, plural layers of different refractive indices may be stacked to reflect light (that is, a reflecting layer may be formed of a dielectric multilayer). This structure enables an improvement in the reflectivity of the reflecting layer 3 above the top of the scatterer 1 and a further reduction in the amount of the light 7 traveling back to the light source.

Figure 8:
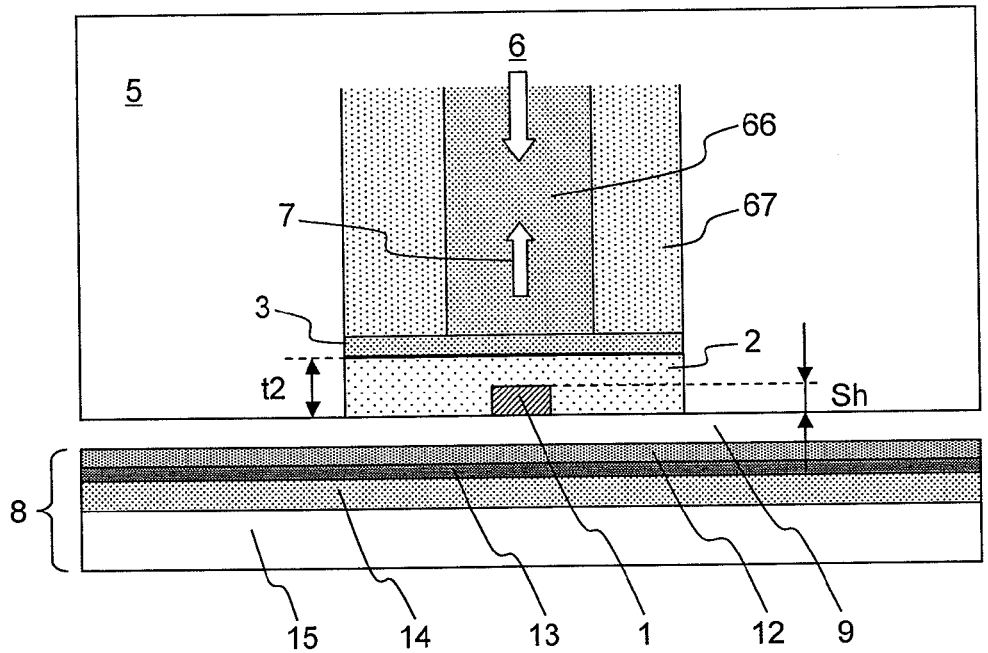
FIG. 8 is a cross-sectional view showing an instance where the scatterer and the reflecting layer are disposed on the end of a waveguide.

The reflecting layer 3 for reflecting light or the layer 50 having different refractive indices on both sides may be formed on the end of a waveguide. FIG. 8 shows an embodiment in which the reflecting layer 3 is formed on the end of the waveguide. The waveguide for guiding light to an optical near-field generator element, which is configured of a core 66 and a cladding 67, is formed in the slider 5 that forms the base of the head. The scatterer 1 for generating an optical near-field and the reflecting layer 3 are formed under the waveguide. A material for the core 66 of the waveguide is $Ta_2O_5$ (with a refractive index of 2.18), and a material for the cladding 67 thereof is $SiO_2$. The core is square in cross section and has dimensions of 500 nm by 500 nm. The cladding is likewise square in cross section and has dimensions of 1.0 μm by 1.0 μm. The material for and dimensions of the scatterer 1, the structure of the medium, and others are the same as those in the above embodiment. The reflecting layer 3 is made of gold and is 20 nm in thickness. The thickness $t_2$ of the layer around the scatterer is substantially equal to 240 nm so as to minimize the amount of the light 7 traveling back to the light source.

Figure 9:
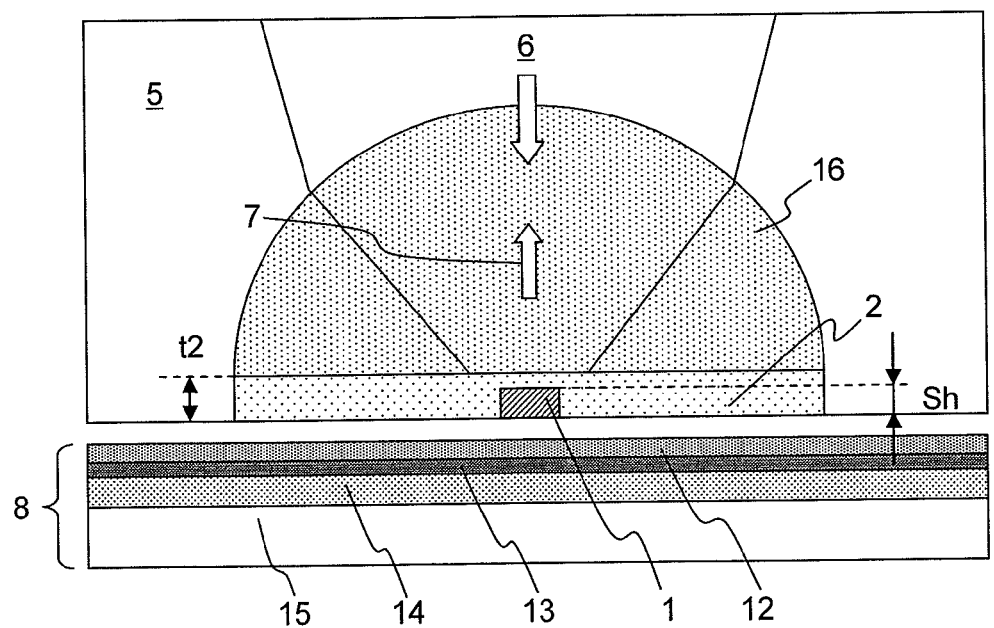
FIG. 9 is a cross-sectional view showing an instance where the scatterer and the reflecting layer are disposed on the bottom of a condenser lens.

A lens may be used as an element for inputting light, in place of the waveguide. The scatterer and the reflecting layer 3 or the layer 50 having different refractive indices on both sides may be formed on the bottom of the lens. FIG. 9 shows an embodiment using the lens. In this embodiment, a hemispherical lens made of $Bi_4Ge_3O_{12}$ (with a refractive index of 2.23) is used as the lens. A lens 16 is formed on the bottom of the slider 5 so that the incoming light 6 can enters the lens 16 to converge to the bottom of the hemispherical lens. The scatterer 1 is formed at the center of the lens. The shape of and the material for the scatterer are the same as those in the above embodiment. The material for the layer 2 around the scatterer 1 is $SiO_2$. The thickness $t_2$ of the layer around the scatterer is substantially equal to 240 nm so as to minimize the amount of the light 7 traveling back to the light source. In the embodiment, a focal point of the incoming light focused by the lens is located on the interface between the lens and the layer 2. However, the focal point may be located in the layer 2 (or between the interface between the lens and the layer 2 and the bottom of the slider) or on the bottom of the slider.

Figure 10:
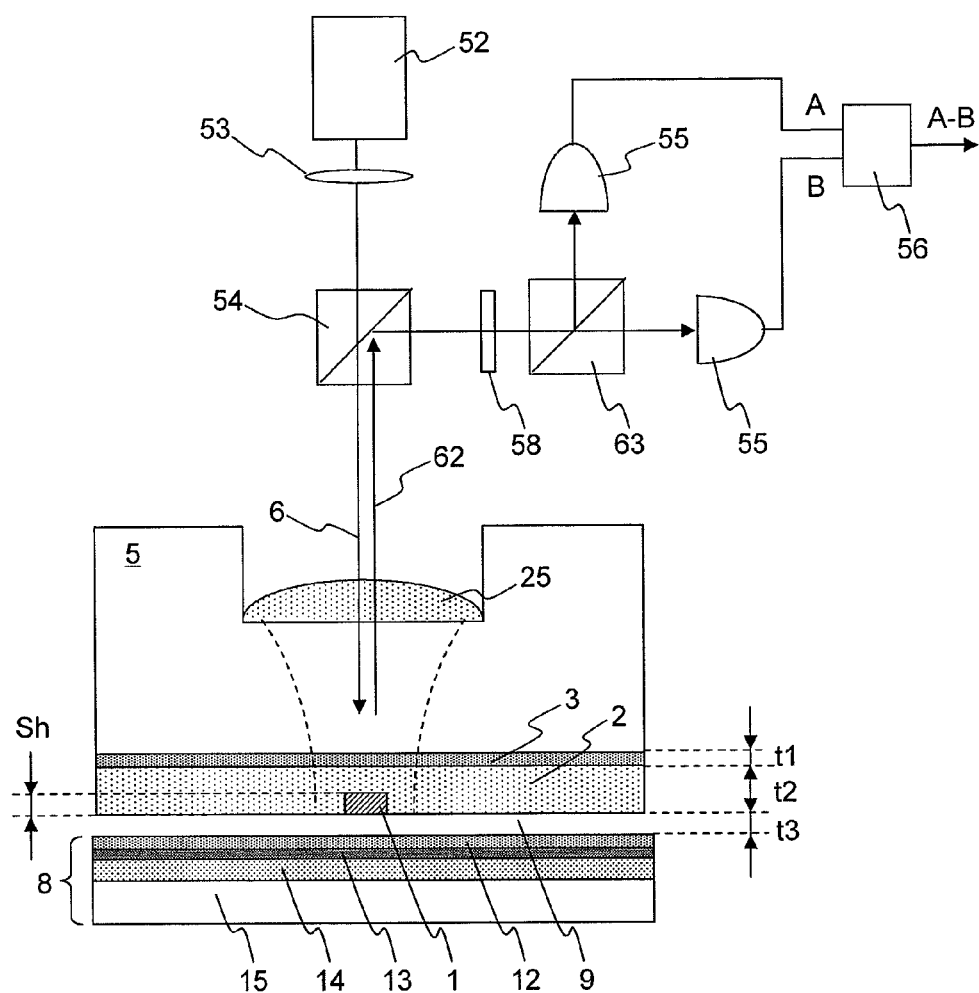
FIG. 10 is an illustration showing an example of an optical system for reproduction.

FIG. 10 shows an optical system (including an optical system for reproduction) in which the optical near-field generator has the structure shown in FIG. 1. The scatterer 1 and the reflecting layer 3 are formed on the bottom of the slider 5, and a condenser lens 25 is formed above the scatterer 1 and the reflecting layer 3. The scatterer 1 is located on a focal point of light (shown by the broken lines in FIG. 10) focused by the lens 25. The structures of the scatterer 1, the reflecting layer 3 and the medium 8 are the same as those shown in FIG. 1. A semiconductor laser with a wavelength of 780 nm is used as the light source. A collimator lens 53 collimates laser light to form the collimated light, which in turn is caused to enter the condenser lens 25. Scattered light (or a signal beam) 62 generated by the interaction of an optical near-field generated by the scatterer 1 with the medium is split by a beam splitter 54. Recorded information is read by detecting the rotation of polarization of the signal beam 62 (caused by the Kerr effect). To detect the rotation of polarized light, the signal beam 62 is caused to enter a half-wave plate 58 and is then split into two polarization components by a polarization beam splitter 63. The split light beams are detected by photodiodes 55, respectively. Signals from the two photodiodes are differentiated and amplified by a differential amplifier 56.

Second Embodiment

Using the structure having the reflecting layer formed therein as described above makes it possible to monitor the flying height of the slider (or the distance between the bottom of the slider and the surface of the medium 8), as well as adjust the amount of light traveling back to the light source and the intensity of optical near-field. In the recording apparatus utilizing an optical near-field, the optical near-field is localized in the vicinity of the optical near-field generator. Accordingly, variations in a flying height $t_3$ cause variations in the intensity of optical near-field on the surface of the medium, and thus rendering it difficult to form a uniform recorded mark. It is therefore desirable that the flying height be controlled to be uniform. This requires a mechanism for monitoring the flying height with precision, and the structure having the reflecting layer formed therein as described above can be utilized for a flying height monitor. Description will hereinafter be given with regard to an embodiment of a recording and reproduction apparatus having the function of monitoring the flying height of the slider.

In the structure having the reflecting layer 3 formed therein as shown in FIG. 1, variations in the flying height $t_3$ cause variations in the distance between the reflecting layer and the medium, and hence variations in the phase difference between the reflected light $L_1$ and the light beams $L_2$ and $L_3$ reflected from the surface of the medium. This leads to variations in the conditions of interference therebetween and hence variations in the intensity of the light 7 traveling back to the light source. The flying height can be therefore monitored by monitoring the amount of change in the reflected light.

Figure 11:
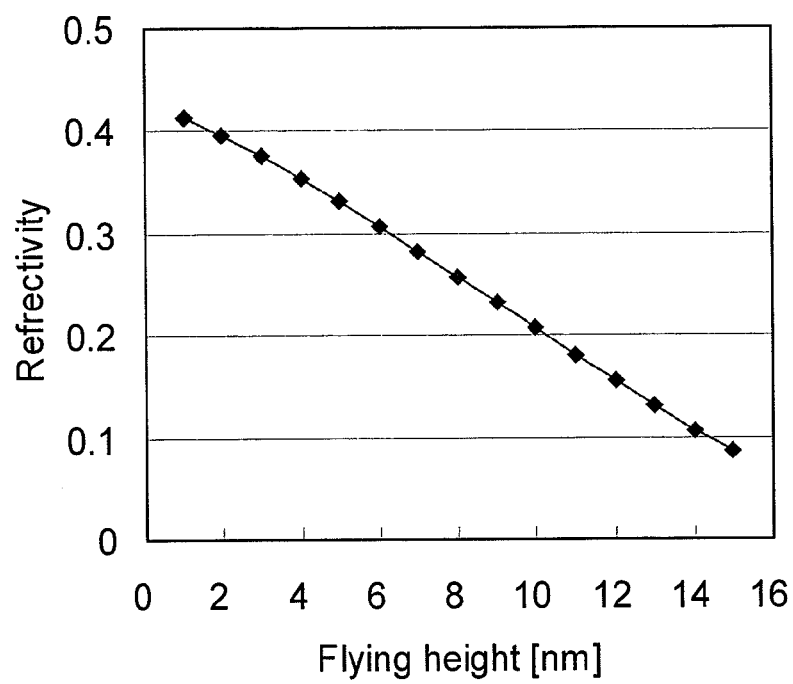
FIG. 11 is a plot showing the relation between a flying height and the reflectivity.

To estimate the amount of the light 7 traveling back to the light source, it is strictly necessary to take into account the thickness $t_1$ of the reflecting layer 3, the reflection from the surface of the slider, the internal structure of the medium 8, and so on. Specifically, the amount of the returned light 7 is determined by the above equation (1). FIG. 11 shows the relation between varying flying heights and the intensity of the returned light 7, when the amount of the flying height is changed in the structure shown in FIG. 1. At this point, the materials for and dimensions of the scatterer 1 for generating an optical near-field, the reflecting layer 3, and the medium are the same as those shown in FIG. 1. The material for the layer 2 around the scatterer 1 is $SiO_2$. The wavelength of incoming light is 780 nm. As shown in FIG. 11, variations in the flying height cause variations in the intensity of the returned light 7. To increase the amount of change in the returned light 7 with respect to the amount of change in the flying height, the thickness $t_2$ of the layer 2 around the scatterer, in FIG. 3, can be slightly shifted from the thickness that minimizes the reflectivity R. Specifically, the thickness $t_2$ of the layer 2 around the scatterer is set so as to substantially maximize the absolute value of the reflectivity R differentiated with respect to $t_3$:

$$\left|\frac{dR}{dt_3}\right| = |f'(t_f)|$$

where $t_f$ denotes a desired flying height, provided that the relation between the flying height $t_3$ and the reflectivity R can be expressed as an equation, $R=f(t_3)$. This makes it possible to detect the flying height with the highest sensitivity. In the embodiment, the thickness $t_2$ is 190 nm.

Figure 12:
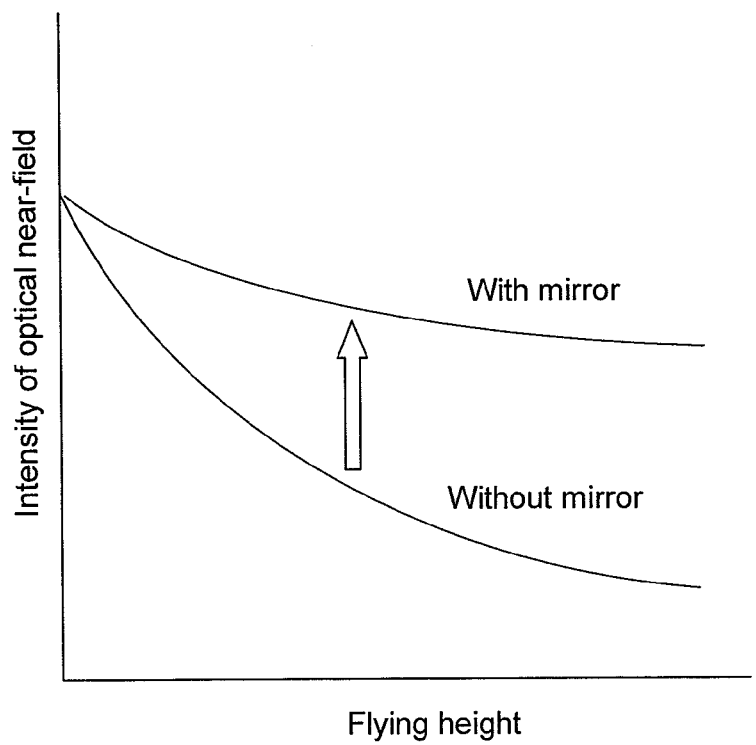
FIG. 12 is a plot showing the relation between the intensity of optical near-field on the surface of a medium and the flying height in the presence and absence of the reflecting layer.

The optimum thickness $t_2$ of the layer 2 around the scatterer for the monitoring of the flying height is present at two points: the point where the magnitude of the reflectivity R differentiated with respect to $t_3$ is plus; and the point where the magnitude thereof is minus. Although any of these two points may be used, it is desirable that the thickness $t_2$ of the layer 2 around the scatterer be set so that the magnitude of the reflectivity R differentiated with respect to $t_3$ can be minus. Generally, great flying height $t_3$ leads to low intensity of optical near-field on the recording layer of the medium. On the other hand, when the thickness $t_2$ is set so that the magnitude of the reflectivity R differentiated with respect to $t_3$ can be minus, the intensity of optical near-field increases with increasing flying height $t_3$ (that is, the intensity of optical near-field increases as shown in FIG. 3 because an increase in the flying height $t_3$ is equivalent to an increase in the thickness of the layer 2 around the scatterer). In other words, the presence of the reflecting layer 3 enables a reduction in variations in the intensity of optical near-field on the recording layer of the medium due to the variations in the flying height, as shown in FIG. 12.

Figure 13:
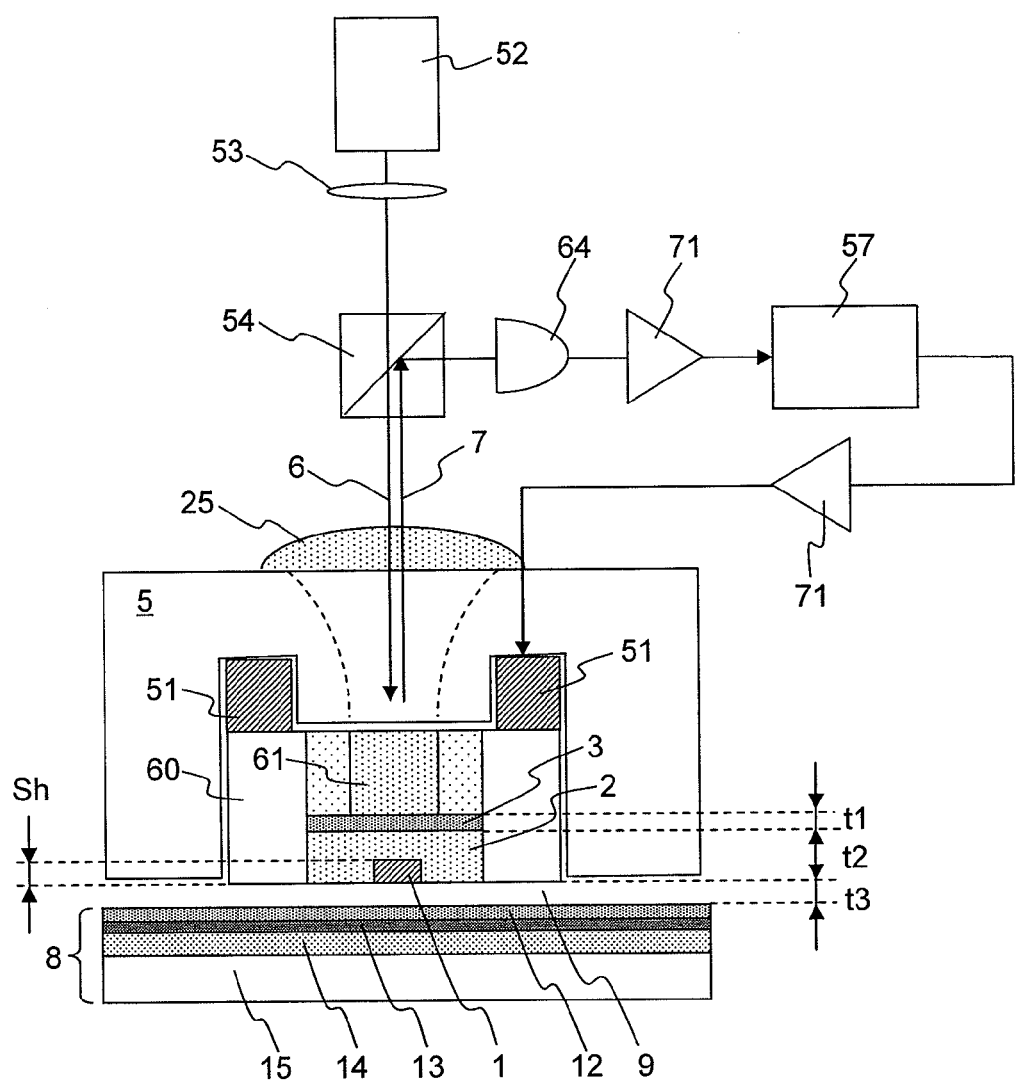
FIG. 13 is an illustration showing an example of an optical system for monitoring of flying height.

FIG. 13 shows an embodiment of a flying height control mechanism utilizing a method of monitoring a flying height as described above. The scatterer 1 for generating an optical near-field and the reflecting layer 3 are formed under a waveguide 61, and they are formed on a moving part 60. Light produced by a semiconductor laser 52 is caused to enter the microlens 25 formed on top of the slider, and the center of the core of the waveguide 61 corresponds to a focal point of the light focused by the lens (as shown by the broken lines in FIG. 13). The light 7 traveling back to the light source is split from the incoming light 6 by use of the beam splitter 54, and the split light is detected by use of a photodiode 64. The magnitude of an output from the photodiode corresponds to the magnitude of the flying height. The output from the photodiode is amplified by an amplifier 71 and is then caused to enter a PI (proportional-plus-integral) control circuit 57. The inside of the PI control circuit 57 compares the output from the photodiode to a reference voltage, and then outputs a voltage proportional to a difference between the output from the photodiode and the reference voltage. The output is amplified by the amplifier 71, and is then caused to enter an element for changing the flying height. In the embodiment, a piezoelectric element 51 is used as the element for changing the flying height. The piezoelectric element 51 is mounted on top of the moving part 60, and an output from the amplifier 71 is applied to the piezoelectric element. In the embodiment, the piezoelectric element is used as means which changes the flying height. However, a heater may be disposed in the slider to heat the slider so as to expand the slider on and near the optical near-field generator element, and thereby effect a change in the flying height $t_3$. The amount of light from the semiconductor laser 52, rather than the flying height in itself, may be changed to suppress the variations in the intensity of optical near-field due to the variations in the flying height. In other words, the variations in the flying height lead to the variations in the intensity of optical near-field on the recording layer of the medium. At this point, the intensity of an output from the semiconductor laser 52 may be changed according to the amount of change in the flying height so that the intensity of optical near-field can be uniform on the recording layer.

Figure 14:
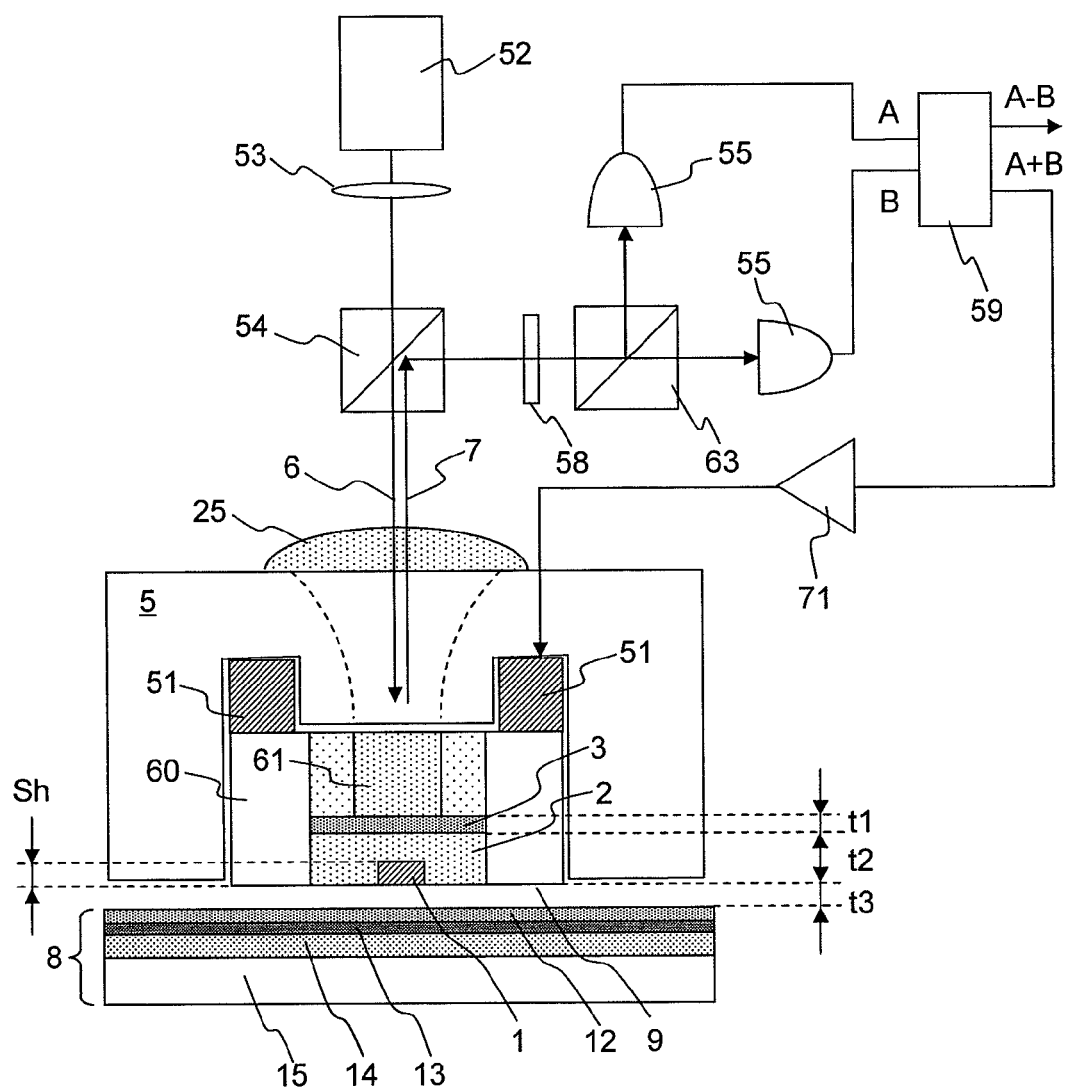
FIG. 14 is an illustration showing an example of an optical system for simultaneously performing the reproduction of a recorded signal and the monitoring of the flying height.

FIG. 14 shows an embodiment of an optical system for simultaneously performing the monitoring of the flying height and the reproduction of recorded information. The light 7 traveling back to the light source is caused to enter the half-wave plate 58, and is then split into two polarization components by the polarization beam splitter 63. The split light beams are detected by the photodiodes 55, respectively. The half-wave plate 58 is adjusted so that the direction of polarization of light entering the polarization beam splitter can tilt 45 degrees with respect to the direction of polarization of light passing through the polarization beam splitter. To reproduce the recorded information, a difference between the intensities of the signals from the two photodiodes is detected as in the case of the embodiment shown in FIG. 10. To monitor the flying height, the sum of the intensities of the signals from the two photodiodes is detected.

Setting such thickness $t_2$ as maximizes the absolute value of the differentiated reflectivity R leads to a higher intensity of the light 7 traveling back to the light source and a lower intensity of optical near-field, as compared to the intensities that are obtained when the thickness $t_2$ is set so as to minimize the reflectivity R. To prevent this, $t_2$ may be set between the thickness that maximizes the absolute value of the reflectivity R differentiated with respect to the flying height $t_3$ and the thickness that minimizes the reflectivity R. Alternatively, second light having a different wavelength from that of light for use in optical near-field generation may be caused to enter monitor the flying height. In other words, the thickness $t_2$ of the layer 2 around the scatterer 1 is set so as to minimize the reflectivity R for the light for optical near-field generation. At this point, the entry of the second light with the different wavelength leads to an increase in the reflectivity R for the light with this wavelength.

Figure 15:
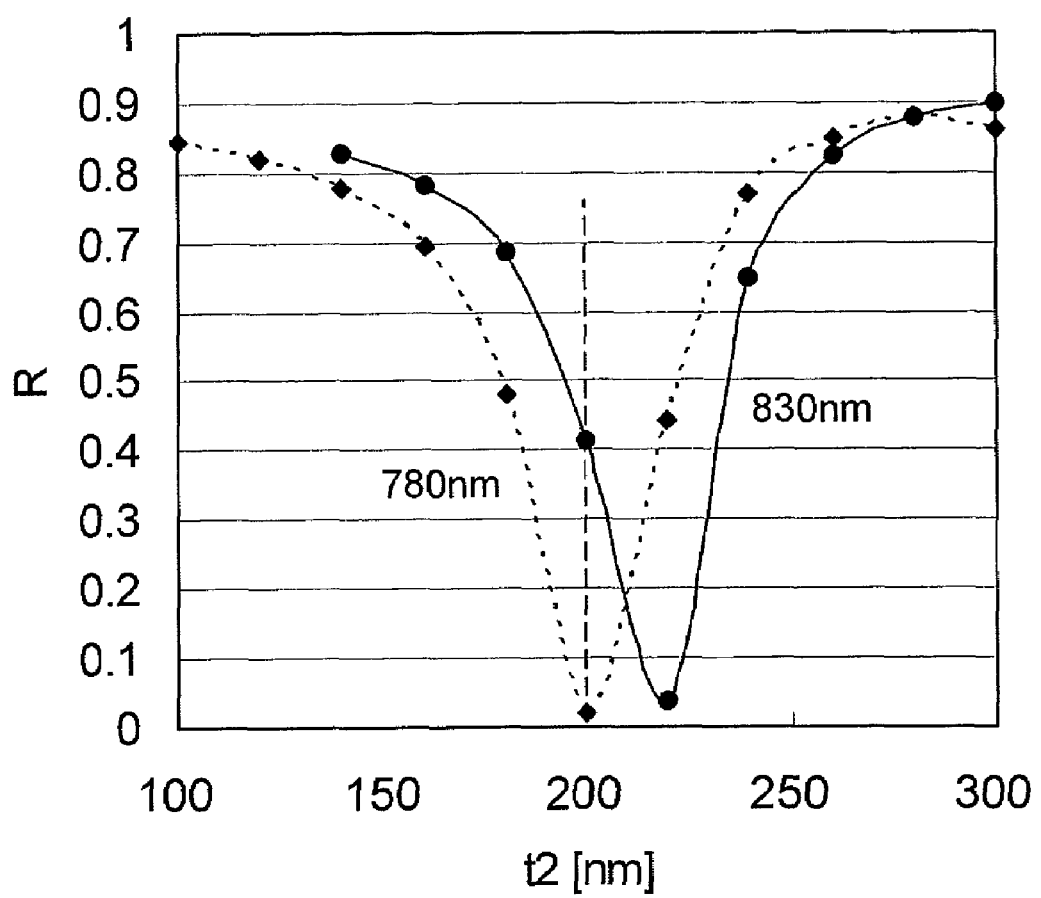
FIG. 15 is a plot showing the relation between the thickness $t_2$ of the layer around the scatterer and the reflectivity, which exists in the cases of light with a wavelength of 780 nm and light with a wavelength of 830 nm.

FIG. 15 shows the relation between the thickness $t_2$ of the layer 2 around the scatterer 1 and the reflectivity, which exists: when light with a wavelength of 780 nm is utilized as the light for optical near-field generation; and light with a wavelength of 830 nm is utilized as the second light for monitoring of flying height. At this point, the materials for and dimensions of the scatterer 1 for generating an optical near-field, the reflecting layer 3, and the medium are the same as those shown in FIG. 1. The material for the layer 2 around the scatterer is $SiO_2$. In FIG. 15, the broken line indicates the reflectivity for the light with a wavelength of 780 nm, and the solid line indicates the reflectivity for the light with a wavelength of 830 nm. As shown in FIG. 15, the reflectivity for the light with a wavelength of 780 nm is minimized when the thickness $t_2$ of the layer 2 around the scatterer is 200 nm. At this point, the absolute value of the reflectivity R differentiated with respect to $t_2$ ($dR/dt_2$) becomes large for the light with a wavelength of 830 nm. When the magnitude of the reflectivity R differentiated with respect to $t_2$ ($dR/dt_2$) becomes large, the magnitude of the reflectivity R differentiated with respect to $t_3$ ($dR/dt_3$) also becomes large. For this reason, the thickness $t_2$ of the layer 2 around the scatterer is set to 200 nm, and the light with a wavelength of 830 nm from the scatterer is monitored. This makes it possible to measure the flying height with high sensitivity.

Figure 16:
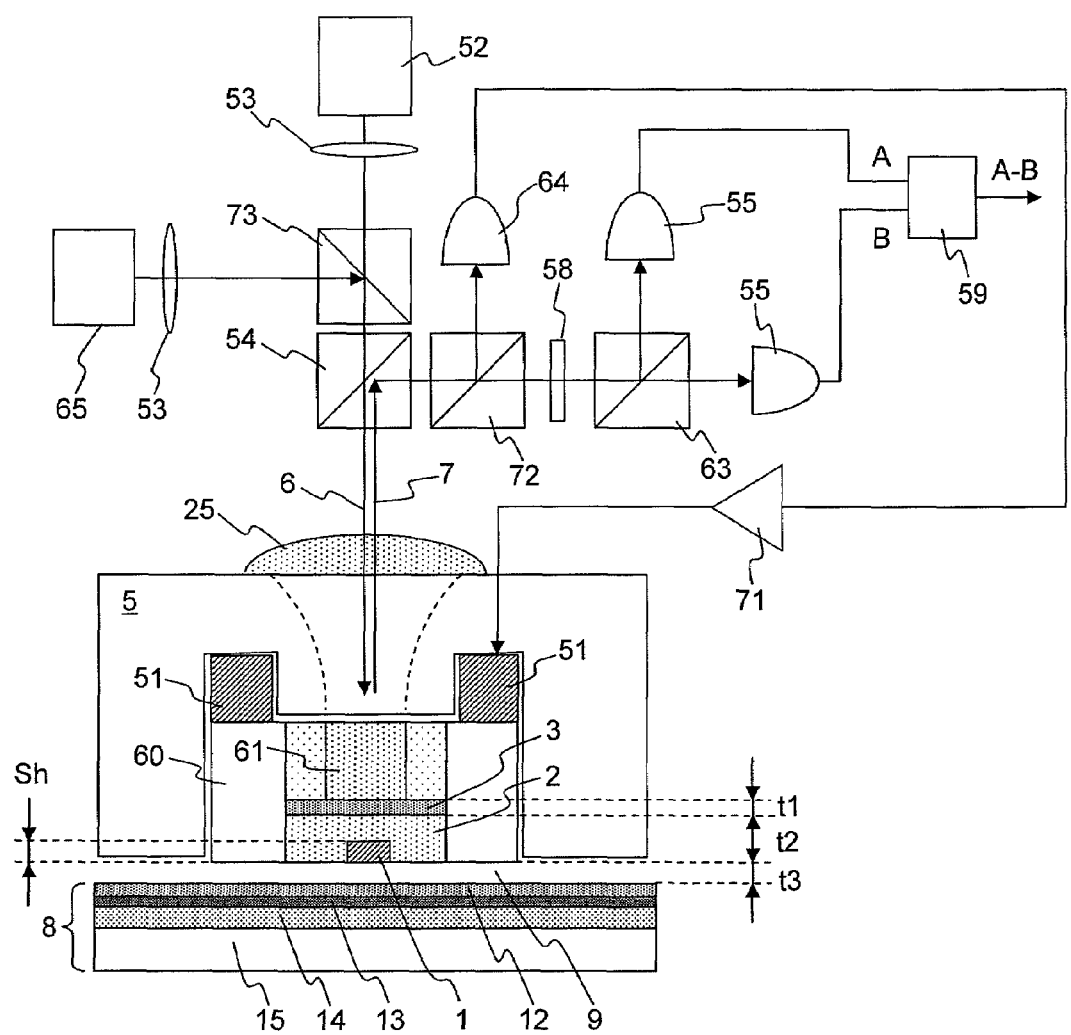
FIG. 16 is an illustration showing an instance where two light beams of different wavelengths are used.

FIG. 16 shows an embodiment of an optical system using light of two different wavelengths. The semiconductor laser 52 with a wavelength of 780 nm is used as the light source for optical near-field generation, and a semiconductor laser 65 with a wavelength of 830 nm is used as the light source for monitoring of flying height. Light beams from the two lasers overlap each other by use of a beam splitter 73. The light 7 traveling back to the light source is split by the beam splitter 54, and is then split into light for monitoring of flying height and light for optical reproduction by a dichroic mirror 72 which reflects the light with a wavelength of 830 nm and transmits the light with a wavelength of 780 nm. The light with a wavelength of 830 nm is detected by the photodiode 64. Variations in output from the photodiode correspond to the variations in the flying height. As in the case of the embodiment shown in FIG. 10, the light with a wavelength of 780 nm is split by the polarization beam splitter into two polarization components, which are then detected by the photodiodes 55, respectively. The differential amplifier 56 differentiates signals from the two photodiodes and inputs the result to a signal processing circuit for reproduction signal.

Third Embodiment

Description will now be given with regard to an embodiment in which the optical near-field generator according to the present invention is used in combination with a single pole head for use in a magnetic disk drive unit.

Figure 17:
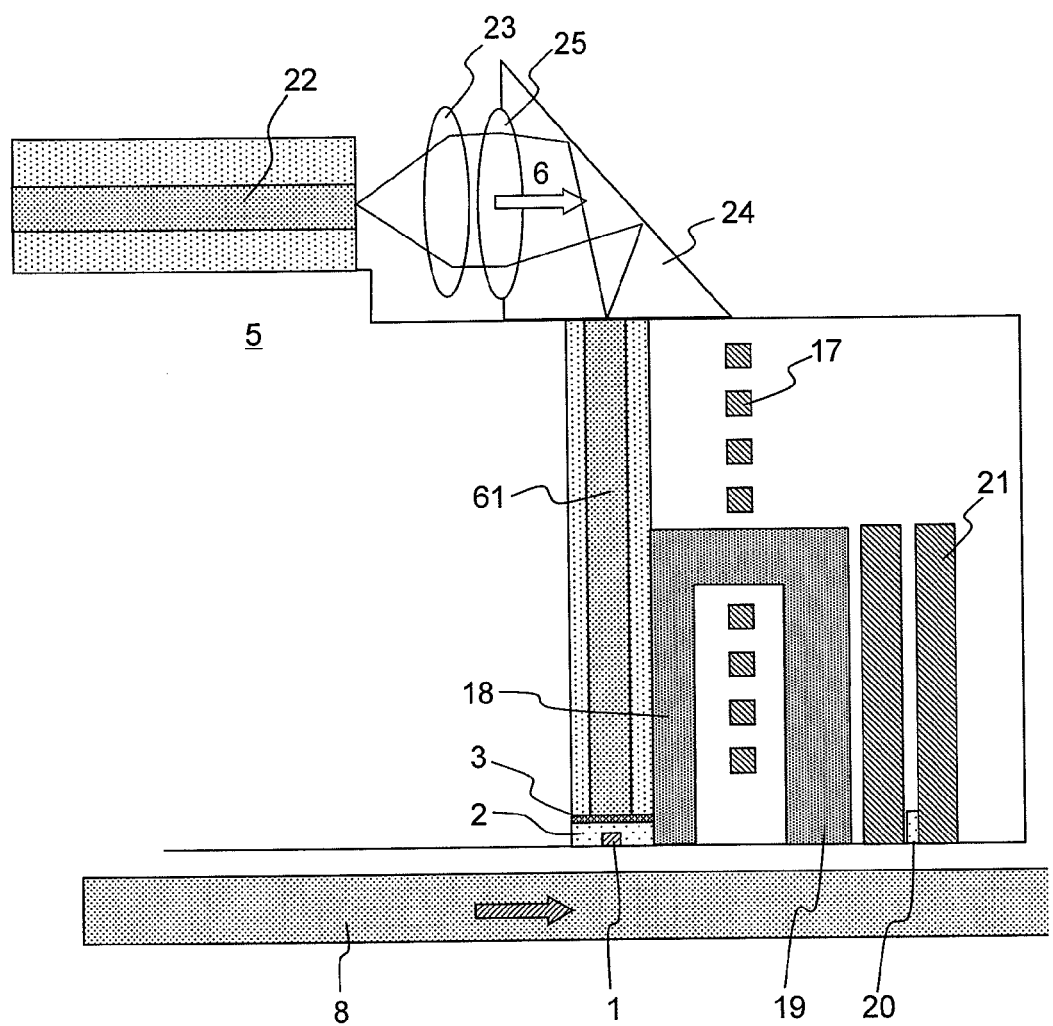
FIG. 17 is an illustration showing an instance where the optical near-field generator is used in combination with a single pole head for use in a magnetic recording apparatus.

FIG. 17 shows a cross-sectional view of a recording head having a combination of the single pole head and the scatterer. The scatterer 1 for generating an optical near-field is formed on top of the slider 5, and the reflecting layer 3 and the waveguide 61 are formed above the scatterer 1. The material for the core of the waveguide is $Ta_2O_5$, and the material around the scatterer is $SiO_2$. The materials for and shapes of the optical near-field generator element and the waveguide are the same as those of the embodiment shown in FIG. 8. Light is produced by use of the semiconductor laser with a wavelength of 780 nm, and the light from the semiconductor laser is guided to the slider by use of a waveguide 22. After exiting the waveguide 22, the light passes through a collimator lens 23 and the condenser lens 25 to a mirror 24, which in turn reflects and couples the light to the waveguide 61 connecting to the optical near-field generator element. The condenser lens 25 is disposed so as to focus the light on the end of the waveguide 61. A magnetic field is generated by use of a thin film coil 17, and the generated magnetic field is guided toward the scatterer 1 by means of a main pole 18. A return pole 19 for forming a closed magnetic path is formed on the opposite side to the thin film coil 17. A magnetic reproduction element 20 for reproducing a recorded mark, such as a giant magnetoresistive (GMR) element or a tunneling magnetoresistive (TMR) element, is formed at the side of the waveguide. A shield 21 for shielding surrounding magnetic fields is formed around the magnetic reproduction element 20. In the above embodiment, the waveguide 22 is used to guide the light from the semiconductor laser to the slider. Besides the use of the waveguide, the semiconductor laser, however, may be disposed directly on the slider (that is, the semiconductor laser is placed at the position of the waveguide 22).

Figure 18:
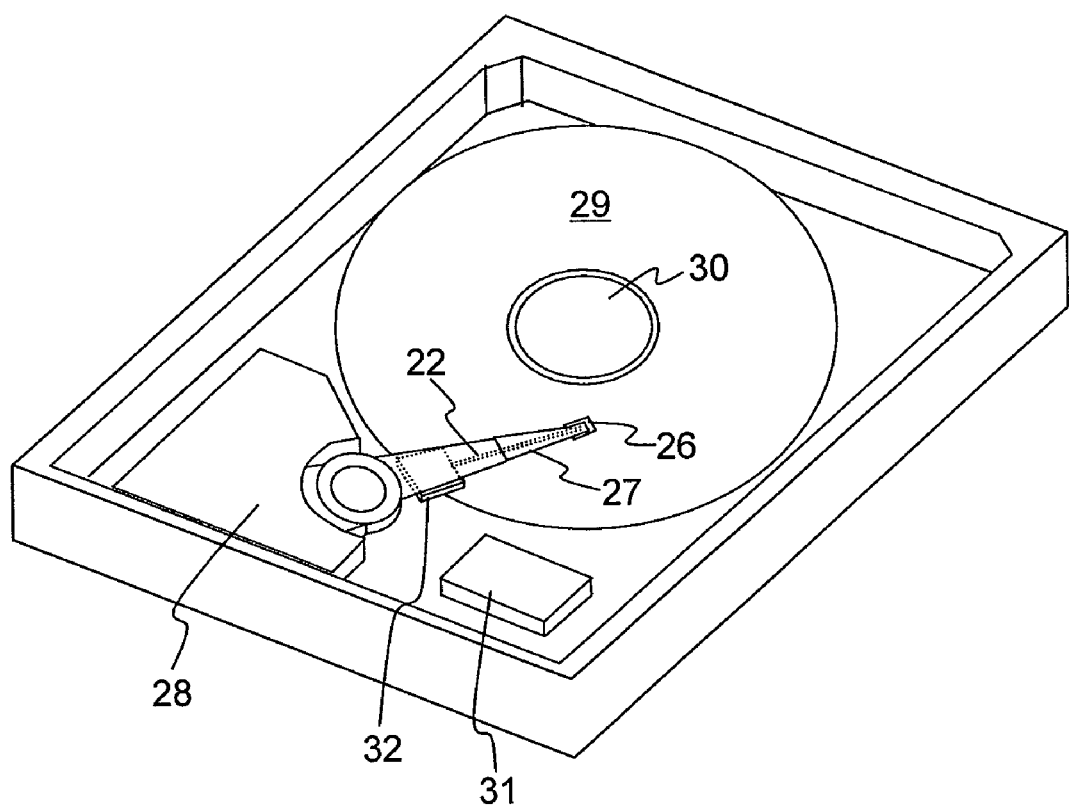
FIG. 18 is a perspective view showing an example of the configuration of a recording and reproduction apparatus.

FIG. 18 shows the general configuration of the recording apparatus using the recording head described above. A slider 26 having the recording head according to the present invention mounted thereon is fixed to a suspension 27 and is moved by a voice coil motor 28. A pad for suspension is formed on top of the head and floated on a magnetic disk 29 at a flying height of 10 nm or less. A magnetic recording medium is used as the magnetic disk 29. The magnetic disk 29 is rotated as fixed to a spindle 30 rotatably driven by a motor. At the instant of recording, a magnetic field is generated by the coil disposed in the recording head, and at the same time, light is emitted by the semiconductor laser, so that a recorded mark is formed. The optical systems for optical reproduction and monitoring of flying height, as shown in FIGS. 10 and 13 and others, are configured as a compact-size optical module 32, which is disposed at the base of the suspension. Light from the compact-size optical module 32 is guided to the recording head in the slider 26 by use of the waveguide 22. A signal processing circuit 31 generates a recording wave and processes a reproduction signal.

In the above embodiment, the magnetic medium is used as the recording medium. However, a phase change medium, a photochromic medium, or the like may be used to configure the recording apparatus. In this case, the magnetic reproduction element 20 may be replaced as the reproduction element by detecting a change in the intensity of scattered light originating from the scatterer 1 for generating an optical near-field.

What is claimed is:

1. An optical near-field generator, comprising:
   a light source;
   a scatterer that receives light from the light source, and that irradiates an object to be irradiated with an optical near-field;
   a film surrounding the sides and top of the scatterer; and
   a reflecting layer disposed on the film;
   wherein the thickness of the film is greater than zero and is not more than three times the wavelength of the light propagating through the film from the light source.

2. The optical near-field generator according to claim 1, wherein the reflecting layer is any one of a metal layer, an interface between two layers of different refractive indices, and a dielectric multilayer.

3. The optical near-field generator according to claim 1 wherein multiple beam interference occurs between the reflecting layer and the surface of the object to be irradiated, through the film.

4. An optical near-field generator, comprising:
   a light source;
   a scatterer that receives light from the light source and irradiates an object to be irradiated with an optical near-field;
   a film surrounding the sides and top of the scatterer; and
   a reflecting layer disposed on the film;
   wherein the film has the thickness that minimizes the intensity of returned light traveling above the reflecting layer or the thickness that maximizes the intensity of the optical near-field generated by the scatterer.

5. The optical near-field generator according to claim 4, wherein the reflecting layer is any one of a metal layer, an interface between two layers of different refractive indices, and a dielectric multilayer.

6. The optical near-field generator according to claim 4 wherein multiple beam interference occurs between the reflecting layer and the surface of the object to be irradiated through the film.

7. The optical near-field generator according to claim 4, wherein the thickness of the film is greater than zero and is not more than three times the wavelength of the light propagating through the film from the light source.

8. A recording and reproduction apparatus, comprising:
   a recording medium;
   a medium driver that drives the recording medium;
   a head that performs recording and reproduction operation on the recording medium; and
   a head driver that controls the position of the head above the recording medium,
   wherein the head includes a light source, a scatterer that receives light from the light source, and that irradiates the recording medium with an optical near-field, a film surrounding the sides and top of the scatterer, a reflecting layer disposed on the film, and a photodetector that detects the intensity of reflected light traveling above the reflecting layer;

wherein the flying height of the head above the surface of the recording medium is detected using an output from the photodetector; and wherein the thickness of the film surrounding the sides and top of the scatterer is set so as to minimize the intensity of returned light, of the light for generating the optical near-field, traveling above the reflecting layer.

9. The recording and reproduction apparatus according to claim 8, wherein the thickness of the film surrounding the sides and top of the scatterer is set so as to substantially maximize the absolute value of R differentiated with respect to t:

$$\left|\frac{dR}{dt}\right| = |f'(t_0)|$$

where t denotes the flying height, R denotes the ratio between the intensity of light incident on the reflecting layer and the intensity of the reflected light, and $t_0$ denotes a desired flying height, provided that the relation between the flying height t and the intensity ratio R can be expressed as an equation, R=f(t).

10. The recording and reproduction apparatus according to claim 8, comprising driving means which moves a structure relative to a body of the head in a direction of change of the flying height, the structure including the scatterer, the film surrounding the sides and top of the scatterer, and the reflecting layer disposed on the film, wherein the amount of movement by the driving means is controlled by using an output from the photodetector.

11. The recording and reproduction apparatus according to claim 8, wherein:

second light with a different wavelength from that of the light for generating the optical near-field is caused to enter the head; and returned light of the second light is detected by the photodetector, whereby the flying height is detected.

12. The recording and reproduction apparatus according to claim 8, wherein the thickness of the film is greater than zero and is not more than three times the wavelength of the light propagating through the film from the light source.

* * * * *